March 20, 1928.
L. GARRETT
1,662,968
TIRE ALARM
Filed April 21, 1926
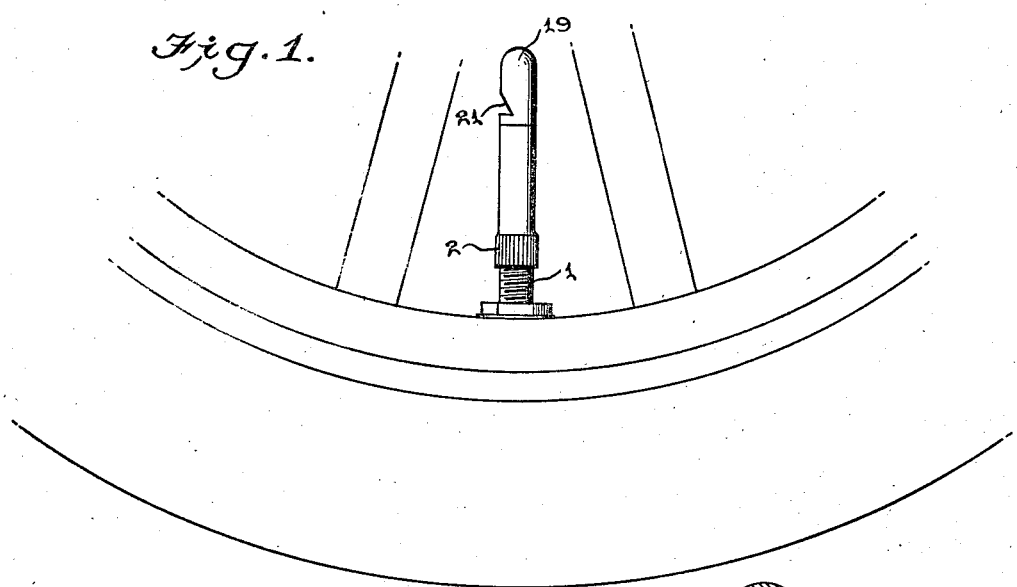
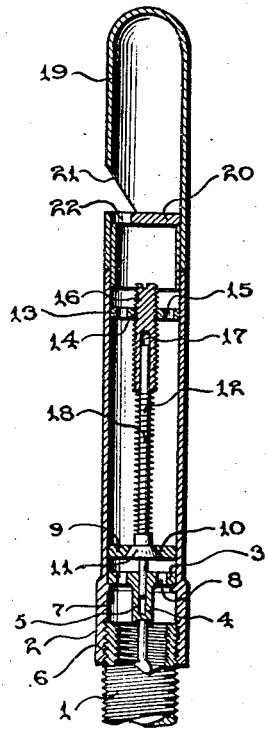
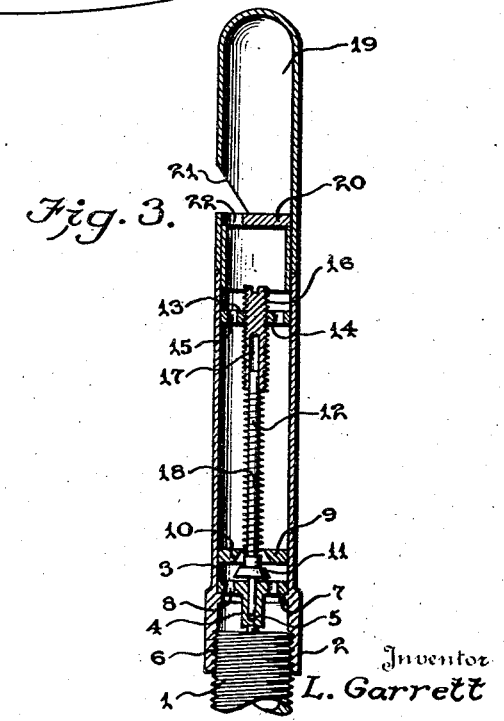
Inventor
L. Garrett
Attorney Patented Mar. 20, 1928.

1,662,968

UNITED STATES PATENT OFFICE.

LEE GARRETT, OF BORGER, TEXAS.

TIRE ALARM.

Application filed April 21, 1926. Serial No. 103,528.

The present invention has for its purpose to provide an alarm for use on inflating valve casings for denoting when the tire needs inflation.

Flat tires are caused from punctures or slow leaks, and, in order to denote when the tire needs inflation, the present construction of alarm includes means to be set to sound the alarm at different pressures of air in the tire. For instance, the alarm may be set to sound at any desired pounds pressure in the tire, for instance, ten, fifteen, twenty or twenty-five pounds. When the tire deflates due to puncture and particularly due to slow leaks, a means, such as a tensioned valve, opens at ten, fifteen, twenty or twenty-five pounds pressure, depending on its adjustment, allowing the escape of air to sound the alarm. The pressure of air above any one of these amounts of pressure of air in the tire or other pressure, it depending on the adjustment of the valve, retains the valve closed.

A further purpose is to provide means on the interior of the casing of the alarm device to hold the inflating valve open, the desired amount of pounds pressure in the tire acting to retain the tensioned valve of the alarm closed until the pressure reduces to the amount at which the tensioned valve of the alarm is set to open.

The invention comprises further features and combinations of parts to be hereinafter set forth, shown in the drawings and claimed.

In the drawings:

Figure 1 is a view in side elevation of a portion of an automobile wheel with its tire applied, illustrating the improved alarm as applied.

Figure 2 is a sectional view through the alarm still showing it applied to the inflating valve casing, with the inflating valve open and the valve of the alarm device closed due to the desired pressure in the tire.

Figure 3 is a view similar to Figure 2, but showing the valve of the alarm device open, it being understood that the alarm is being given as to the tire requiring inflation.

Referring to the drawings, 1 designates a portion of the inflating valve casing of the tire of a wheel and 2 denotes the casing of the alarm device. The casing 2 has an interior disk wall 3 provided with a central extension 4 which is hollow, as indicated at 5. This extension 4 bears upon the stem of the inflating valve and retains the same open as long as the casing 2 is threadingly connected at 6 to the inflating valve casing.

An annular cushion or packing ring 7 is suitably retained in the casing 2 adjacent the disk wall 3 and the cylindrical wall of the casing 2 to bear upon the marginal edge of the inflating valve casing to insure a tight fit. The disk wall 3 is provided with a plurality of openings or perforations 8 which permit the escape of air from the tire, the air to act upon a valve to hold it closed as long as the desired pressure of air remains in the tire.

The casing 2 has a disk wall or partition 9 provided with a valve seat 10 with which a valve 11 cooperates. The valve 11 constitutes an element of the alarm and is carried by a stem 12. One end of the stem 12 is guided in the hollow 5 of the extension 4 while the bottom of the hollow 5 cooperates with the stem to limit the valve 11 in its opening position. The casing 2 near its outer end has an additional wall 13 provided with a central threaded opening 14 and a plurality of annularly arranged openings or perforations 15. An adjusting screw 16 is threadedly mounted in the opening 14 and is provided with a hollow 17 to receive the other end of the stem 12 of the valve 11.

The hollows 5 and 17 act as guides for the stem of the valve 11, there being an expansion spring 18 in surrounding relation with the stem 12 to cause the valve 11 to open when the pressure in the tire decreases to an amount below the amount at which the valve is set to open. As long as the pressure of air in the tire is in excess of the amount at which the valve 11 is set to open, the valve 11 is retained closed due to the pressure of air in the tire. The adjusting screw 16 has a kerf or slot to receive the end of a screw-driver or similar tool for adjusting the screw for the purpose of regulating the tension of the spring 18 in order to permit the tension of the spring to open the valve 11 when the pressure of air increases to the amount at which the valve 11 has been adjusted to open.

The casing 2 at its outer end is exteriorly threaded and is engaged by a whistling reed 19 which is in the form of a casing or cap. The whistling reed has an interior disk wall 20 and a reed whistling opening 21 formed in the cylindrical part of the whistling reed 19. In fact, the disk wall 20 is cut away at 22 which, in causing a restriction to the escape of air in conjunction with the whistling reed 19 and its opening 21, creates an alarm in the form of a shrill whistle as the air escapes from the reed.

In the use of the alarm, the adjusting screw 16 is adjusted so that the valve 11 will open at ten, fifteen, twenty or twenty-five pounds or at any amount as may be desired, and then the tire is inflated to the desired amount of pressure say, for instance, fifty, fifty-five or sixty pounds. The alarm is then threaded on the inflating valve casing and should the tire deflate, due to slow leaks or due to a puncture, until the pressure in the tire reduces to the amount at which the spring 18 is tensioned to permit the valve 11 to open, then the lower pressure of air from the tire escapes and passes through the openings or apertures 8 and through the valve seat and then through the opening 15 and escape by way of the openings in the whistling reed, thereby creating a shrill whistle and indicating to the chauffer or owner of the automobile that the tire needs inflating.

The invention having been described, what is claimed is:

An audible low-pressure indicator for vehicle tires comprising a casing provided with spaced disk walls of which one is disposed adjacent one end and provided with a central extension for engagement with and the unseating of the movable element of a tire inflation valve, said extension being provided with a bore opening on that side of the disk wall facing the opposite disk wall, a partition disk wall disposed adjacent the first disk wall and provided with a valve opening, a screw threadingly engaged with the second disk wall in axial alignment with the casing, said screw being provided with an axial bore, a valve engaging the valve seat of the partition disk wall and having a stem slidably engaged in the bores of the extension and the screw, a compression spring in surrounding relation to the stem and compressed between the valve and the extremity of the screw, said spaced disk walls having perforations, and a whistle carried by the casing at its outer end.

In testimony whereof he affixes his signature.

LEE GARRETT.